Sept. 3, 1963    H. W. BOOTHROYD ET AL    3,102,430

GYROSCOPE

Filed May 20, 1960    5 Sheets-Sheet 1

Lewis S. Bostwick
Howard W. Boothroyd
*INVENTORS*

Lewis S. Bostwick
Howard W. Boothroyd
INVENTORS

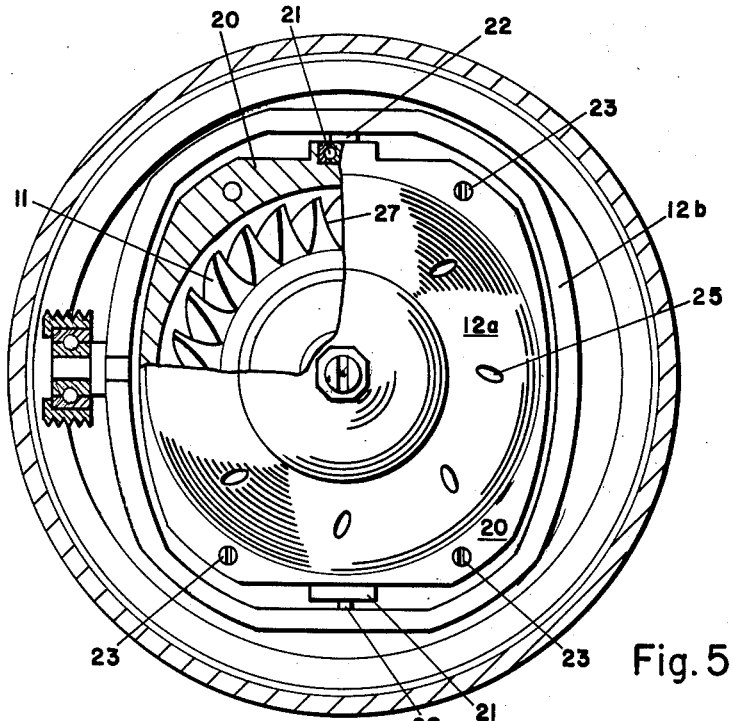
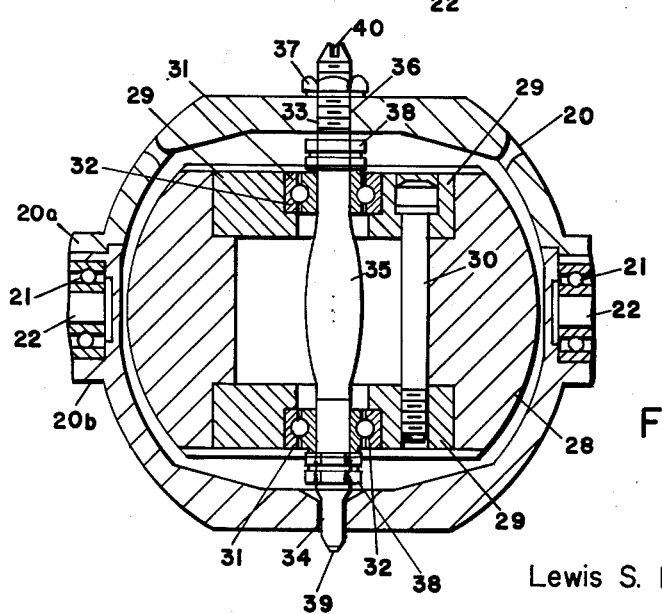

Lewis S. Bostwick
Howard W. Boothroyd
*INVENTORS*

Lewis S. Bostwick
Howard W. Boothroyd
INVENTORS 3,102,430
GYROSCOPE
Howard W. Boothroyd, Amherst, and Lewis S. Bostwick, Nashua, N.H., assignors to Sanders Associates, Inc., Nashua, N.H., a corporation of Delaware
Filed May 20, 1960, Ser. No. 30,611
8 Claims. (Cl. 74—5.7)

The invention relates generally to gyroscopes employed in modern guidance instruments, guided missiles, and the like. More particularly, the invention is directed to fluid pressure actuated gyroscopes that are of small size, light in weight, and economical to manufacture. While the invention is subject to a wide range of applications, it is especially suited for use in missile guidance systems and will be particularly described in that connection.

In modern guidance systems of the single operational use variety, such as used in guided missiles, the need for providing simple, inexpensive, and yet highly reliable components is readily apparent. More particularly, missiles intended for "short range" operation are produced in large quantities; hence, the cost of such missiles and components should be minimized. Furthermore, for missiles in this category components should be capable of storage for indefinite periods of time, capable of becoming operational in an extremely short period of time, and of functioning for a predetermined time during missile flight. A gyroscope intended for use in the above environment, thus, should be relatively inexpensive, capable of attaining sufficient speeds for providing gyroscopic action in a short period of time and being stored for periods of time as long as five years. The gyro rotor rotation must be initiated in a short time and come up to a predetermined speed within a short time thereafter (e.g. 0.10 second). After reaching a predetermined speed, the rotor speed should be maintained at a useful level for a relatively long period of time (e.g. five minutes). The gyroscope should be capable of repeated pretesting prior to intended use for check-out purposes without degrading its operation or contaminating its parts.

Various attempts to solve the above-mentioned problems have included gyroscopes which are electrically driven, spring driven, driven by the products of combustion of an explosive charge and driven by fluid under pressure. An electrically driven gyroscope is relatively high in cost and very complex in nature. This type of gyroscope is usually carried in a running condition so as to be at speed prior to the firing of the missile. The explosive charge type of gyroscope, on the other hand, although less expensive to manufacture than the electrically driven gyroscope, has serious drawbacks in performance. Upon releasing the explosive charge, there is a tendency to contaminate the gyroscope components with the explosive residue, thus impairing the gyroscope's performance. In addition, this type of gyroscope cannot be pretest fired so that performance characteristics can be accurately predicted prior to the gyroscope's operational use. On the other hand, while spring driven units do not have any of the undesirable characteristics of either the electrically driven or explosive type gyroscopes, they do have a serious drawback in most advanced guided missiles in that the performance of the spring driven gyroscope has a tendency to degrade under inertia loads. Finally some prior art gyroscopes are driven by stored fluid under pressure and have external storage devices, such as bottles for storing the fluid prior to its operation. This type of arrangement adds to the weight in the gyroscope, and necessitates the need for fluid passageways and piping to conduct the fluid to the rotor. These additional components add to the cost of manufacture and tend to decrease the reliability of the unit.

In general, the gyroscope of the present invention is a self contained unit. A fluid under pressure, stored within the gyroscope housing, provides a driving means for the rotor. The rotor has impeller blades on its periphery and is supported for rotation about an axis of spin in a gimbal housing. The gimbal housing has orifices in it to allow the fluid within the gyro to be of equal pressure with that within the gimbal housing when the unit is pressurized. In operation a differential pressure is created across the orifices causing a fluid flow therethrough to actuate the rotor. This differential pressure is created by releasing fluid from within the gimbal housing to the atmosphere, which in turn, causes a flow of fluid from the gyro housing through the orifices to the rotor blades. Fluid flow across the impeller blades causes the rotor to accelerate. When all of the available energy is dissipated in accelerating the rotor, a pressure responsive caging mechanism releases the gimbal allowing the gyroscopic instrument to provide reference directional signals. The gyroscope rotor continues to coast for a relatively long period of time at speeds sufficient to provide reliable signals throughout the guidance operation.

Another problem associated with gyroscopes of the type described herein, is that of caging the instrument until sufficient rotor speeds are obtained. The caging mechanism of the present invention is a self contained, pressure actuated, mechanical device. A feature of the present invention is that the caging mechanism is actuated by the fluid pressure within the gyroscope and requires no external energy source for actuation. Because of this type of direct control to operate the caging mechanism, reliability thereof is substantially increased.

It is, therefore, an object of the invention to provide an improved gyroscope capable of reaching a predetermined speed in a relatively short period of time.

Another object is to provide a gyroscope with simplified construction for economical manufacture.

Furthermore, it is an object of the invention to provide a gyroscope that can be actuated after the time of missile launching.

It is a further object of the invention to provide a gyroscope free of contamination in operation.

It is a further object of the invention to provide a gyroscope that can be pretested without impairing its operation or performance.

It is a further object of the invention to provide a gyroscope that is reliable in operation and performance.

It is a further object of the invention to provide an improved pressure actuated caging mechanism.

In accordance with the invention, there is provided a gyroscope having a housing means and a rotor means supported in the housing means. The rotor means has a rotor member rotatable about an axis of spin. In addition, fluid storage means, including means surrounding the rotor member for storing a fluid under pressure are provided. Throttling means are provided for controlling the flow of fluid under pressure from the storage means. Release means coupling the fluid storage and housing means are also provided. The release means controls the release of the fluid under pressure to a low pressure area, and cooperates with the throttling means whereby the fluid flow in the vicinity of the rotor member actuates the rotor member for rotation about the axis and provides the gyroscope.

In one embodiment of the invention, there is provided a caging mechanism in a fluid actuated gyroscope. The fluid actuated gyroscope includes a housing and a gimbal means supported in the housing. A rotor means is pivotally suported in the gimbal means for rotation about an axis. Means for storing a fluid under pressure is also provided within the housing.

The caging mechanism includes a pressure responsive actuating means and a first locking means coupled to the gimbal means and to the pressure responsive means. The first locking means maintains the gimbal means in a caged position prior to filling the fluid storage means with a fluid under pressure. A second locking means is coupled to the gimbal means, the pressure responsive means simultaneously release the first locking means and locks the gimbal means in a caged position upon the introduction of a fluid under pressure to the storage means. Upon the release of the fluid under pressure from the storage means, the second locking member operates to uncage the gimbal. The second locking means operates in accordance with the movement of the pressure responsive means to provide the caging mechanism.

For a better understanding of the present invention, together with other and further objects thereof, reference is made to the following description taken in connection with the accompanying drawings and its scope will be pointed out in the appended claims.

FIG. 5 is a plan view partly in section of the gyroscope shown in FIG. 4 with the cover removed;

FIG. 6 is a sectional view taken along line 6—6 in FIG. 4;

Principles of Operation

Figure 1:
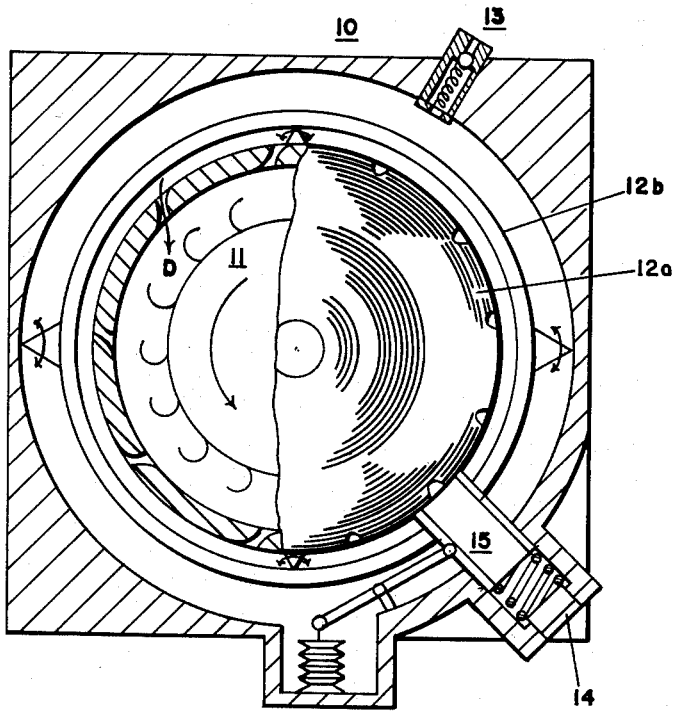
FIG. 1 is a schematic drawing illustrating a gyroscope embodying the present invention.

Referring now to the drawings, and with particular reference to FIG. 1 there is shown a schematic drawing illustrating a gyroscope embodying the present invention. The gyroscope generally includes a housing 10, a rotor 11, gimbals 12a and 12b, a charging valve 13, a release mechanism 14, and a caging mechanism 15.

A compressible fluid under pressure, such as dry nitrogen at 1,000 p.s.i., for example, is introduced into the housing 10 through the charging valve 13. Fluid initially entering the housing 10, flows through orifices in the inner gimbal 12a and surrounds the rotor 11. The filling operation continues until the interior of housing 10 is filled with fluid under a predetermined pressure. After the unit is thus filled, the housing 10 is sealed. In this condition gyroscope may be stored for relatively long periods of time (e.g. 5 years).

To initiate rotor rotation, the release mechanism 14 is energized. Energization of the release mechanism 14 causes a relatively large opening to be made in the housing. As shown in the schematic of FIG. 1, the release mechanism is coupled to the interior of inner gimbal 12a and communicates with the fluid under pressure stored therein. Hence, when the opening is made in the housing fluid flows from inner gimbal 12a to a low pressure area (e.g. the atmosphere). The opening in the housing being relatively large causes this flow to occur at a relatively rapid rate. The relatively rapid flow of fluid surrounding the rotor creates a drop in pressure within the inner gimbal 12a. Hence, a differential pressure occurs between the interior and exterior of the inner gimbal 12a, causing fluid to flow from the housing 10 to the rotor 11 through fluid passageways in the gimbal as shown, for example, by the arrow D. Fluid flowing through the passageways impinges on impeller blades on the periphery of rotor 11 causing the rotor to accelerate. This latter fluid flow takes place at a relatively slow rate (e.g., 500 milliseconds).

While the rotor is being accelerated, the gimbals and plane of the rotor are maintained in a fixed position by a caging mechanism 15. When the rotor has extracted all available energy from the pressurized fluid, the caging mechanism is released. The caging mechanism of the present invention is actuated by a pressure sensitive device. In the preferred embodiment the gimbals are released when the pressure within housing 10 is substantially equal to ambient pressure. At this time the rotor would be at its maximum speed.

Figure 2:
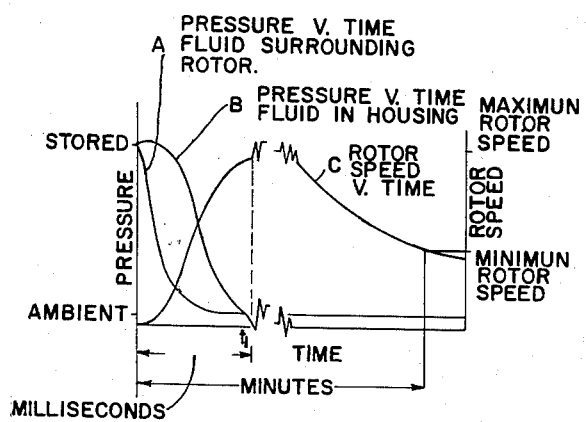
FIG. 2 is a graph of pressure and rotor speed vs. time for a gyroscope made in accordance with the present invention.

Referring now to FIG. 2 of the drawings, there are shown typical pressure and rotor speed vs. time curves for a gyroscope embodying the present invention. Curve A in FIG. 2 is representative of the pressure drop in the fluid surrounding the rotor, while curve B is representative of the pressure drop of the fluid within the housing 10 exterior to inner gimbal 12a. As can be seen from the curves, the pressure of the fluid surrounding the rotor drops to ambient pressure in a relatively short period of time while the fluid within the housing drops to ambient pressure in a relatively long period of time (e.g., 100 milliseconds).

Curve C in FIG. 2 is representative of a typical rotor speed vs. time curve for a gyroscope embodying the present invention. As can be seen from curve C the rotor reaches a maximum speed in a relatively short period of time (e.g., 100 milliseconds). At the maximum speed the gimbals are uncaged and the gyroscope operates to furnish position indication signals in the conventional manner. As can be further seen from curve C the rotor continues to rotate at sufficient speeds for providing gyroscopic action for a relatively long period of time (e.g. five to six minutes).

Detailed Description

Figure 3:
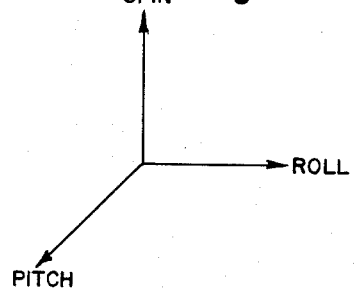
FIG. 3 is a vectorial representation of the gyroscope reference axis.

Referring now to FIG. 3, there is shown a vectorial representation of the reference axes when the gyroscope is in a caged position. As can be seen in FIG. 3, the spin, pitch, and roll axes are defined as mutually perpendicular when the gyroscope is caged. The rotor axis coincides with the spin axis, the inner gimbal pivot axis with the pitch axis and the outer gimbal axis with the roll axis. While the present invention will be described as applied to a gyroscope having two degrees of freedom it is also applicable to a single degree of freedom gyroscope.

Figure 4:
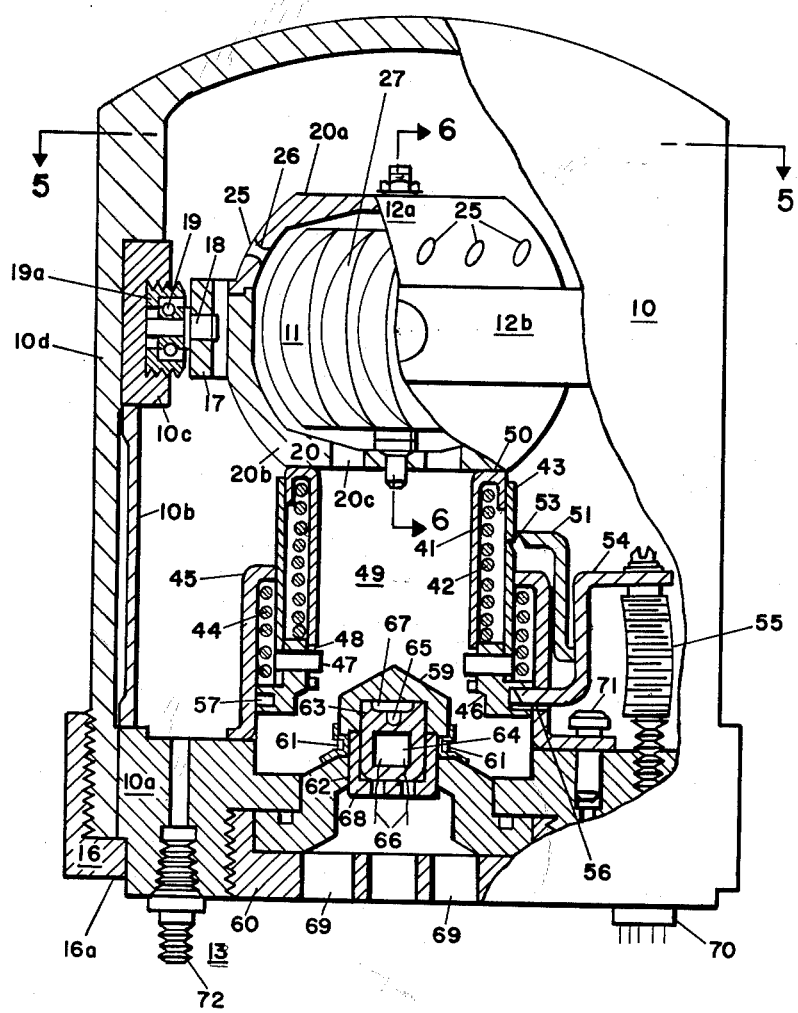
FIG. 4 is a side elevation, partly in section, of a preferred embodiment of a gyroscope made in accordance with the present invention.

Referring now in more detail to the drawings and with particular reference to FIG. 4, there is here illustrated a side elevation partly in section of a preferred embodiment of a gyroscope made in accordance with the present invention. The gyroscope includes a housing generally designated by the numeral 10. The housing comprises a circular base member 10a. Base member 10a supports a cylindrical spacer 10b, an outer gimbal support ring 10c positioned on the spacer outer cover 10d. Cover 10d has a closed end of general spheroidal shape and a cylindrical side wall. At its open end, the cover 10d has circumferential threads thereof for mating with threads on a clamping ring 16. This ring has an inwardly extending lip 16a which abuts against shoulder 10e of base member 10a. This housing assembly is coupled together by threading clamping ring 16 to cover 10d.

Mounted in the housing is an outer gimbal 12b for providing position indication relative to the roll axis. The outer gimbal 12b includes an outer gimbal ring 17 having diametrically opposed shafts 18 supported in bearings 19. Bearings 19 are mounted in retainers 19a which are coupled to the support ring 10c. Bearings 19 permit pivotal motion of the outer gimbal 18 about the bearing centerlines. Since the outer gimbal pivot axis corresponds to the roll axis, in operation the outer gimbal will provide position indication relative to the roll axis.

Referring now to FIGS. 4 and 5, there is shown mounted on the outer gimbal 12b an inner gimbal 12a for providing position indication relative to the pitch axis. The inner gimbal 12a includes a hollow inner gimbal housing 20 of substantially spheroidal shape. Inner gimbal housing 20 is supported on the outer gimbal 21b by diametrically opposed bearings 21 on shafts 22 as shown. Shafts 22 are threadedly coupled to the outer gimbal ring 17 and provide a pivotal support for the inner gimbal housing 20. The inner gimbal member 20 is pivotally mounted on the outer gimbal to provide position indication relative to the pitch axis as indicated in FIG. 3.

Referring again to FIG. 4, one of the unique features of the present invention is directed to a means for storing a fluid under pressure, in the form of housing 10, including means for storing a fluid under pressure surrounding the rotor 11 in the form of inner gimbal housing 20. In addition, the inner gimbal housing 20 has throttling means therein for controlling the flow of fluid from the housing 10 to the rotor 11. The throttling means includes fluid passageways 25 and orifices 26 as shown.

The internal diameter and shape of the passageways 25 and orifices 26 are of critical importance. They are determined by the internal pressure within the housing 10, the desired rate of fluid flow and the desired rotor speed. In addition, the axis of the passageways are aligned in such a direction that the fluid flow through the passageways is directed to impeller blades 27 on the periphery of rotor 11 so that the maximum energy is transferred from the fluid to the rotor. Thus, we see in FIG. 4 there are provided in the form of passageways 25 and orifices 26, throttling means for controlling the flow of fluid.

Referring now to FIG. 5, there is shown a plan view of the gyroscope taken along lines 5—5 in FIG. 4. A novel arrangement of the fluid passageways 25 about the periphery of the inner gimbal housing 20 is shown. It is always desirable to minimize spurious rotations of the gimbals due to extraneous unbalanced forces acting on them. Fluid flowing through orifices 26 causes reaction forces to be applied to inner gimbal 20. In the preferred embodiment, orifices 26 are symmetrically disposed about the inner gimbal periphery. Therefore, fluid reaction forces on the gimbal are balanced and do not tend to rotate the gimbal.

Referring now to FIG. 6, there is shown a sectional view of inner gimbal 20 and rotor 11 taken along the line 6—6 in FIG. 4. As can be seen, rotor 11 includes a mass-member 28. Mass-member 28 is preferably an annular ring having an outer periphery substantially of spheroidal shape. Mass-member 28 is preferably made of a high density material (e.g. sintered tungsten alloy) to provide the necessary inertia for gyroscopic action. A pair of circular end plates 29 are affixed to mass-member 28 by screws 30 substantially as shown. In addition, circular end-plates 29 have apertures 31 therein for receiving the outer race of rotor bearings 32. In the preferred embodiment, motion of the bearing outer race in the apertures is prevented by making the diameter of aperture 31 substantially equal to the diameter of the bearing outer race. Thus, we see in FIG. 6 that rotor means are provided in the form of mass-member 28, circular end plates 29 and rotor bearings 32.

Means for supporting the rotor assembly in inner gimbal 20 are also provided. As can be seen, inner gimbal 20 has a threaded aperture 33 and cylindrical aperture 34 therein, axially aligned along the rotor axis of spin for receiving a rotor support 35. Rotor support 35 is of general cylindrical shape and has circumferential threads 36 on an end thereof for coupling with aperture 33 in inner gimbal 20. A lock nut 37 affixes rotor support 35 to inner gimbal housing 20 for preventing relative rotation thereto. The inner races of rotor bearings 32 are coupled to rotor support 35 and held in place by lock nuts 38. The bearings support rotor 24 for rotation about the rotor support 35.

Rotor support 35 has a cylindrical end portion 39 on the end opposite threads 36 for coupling with a cylindrical aperture 34. The diameter of end 39 and aperture 34 are selected so as to permit unrestrained axial movement of support 35 as the rotor components undergo thermal growth during operation.

Means are also provided for aligning rotor 24 along the axis of spin from a point outside of the inner gimbal housing 20. To accomplish this a slot 40 is provided in support 35 for receiving a screw driver. Rotation of support 35 moves the rotor 24 along the axis of spin. Lock nut 37 retains the rotor in the desired axial position.

In order for the directional signals furnished by the gyroscope to be usable, the signals must be referenced to a set of fixed axes. In order to accomplish this, the axis of spin, roll axis and pitch axis are kept in a fixed position during the acceleration and storage periods. This is accomplished by locking the gimbal in a fixed position during this period. The locking of the gimbals is commonly referred to as "caging."

Figure 7:
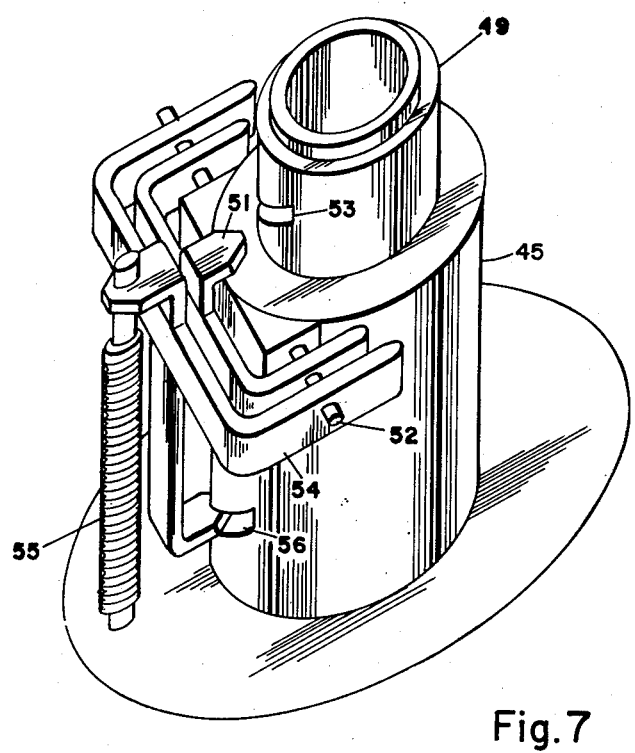
FIG. 7 is a perspective view of a caging mechanism made in accordance with the present invention.

A sectional elevation of the caging mechanism is shown in FIG. 4, and a perspective view is shown in FIG. 7. In the present invention the caging mechanism is pressure responsive in that it locks and unlocks in response to a bellows in the fluid storage area of the housing. The bellows movement causes mechanical linkages to rotate and cage or uncage the unit.

Here the caging mechanism 15 is shown in the caged position after the gyroscope. The caging mechanism includes an inner cylinder 41, a concentric inner cylinder spring 42, a concentric outer cylinder 43, a concentric outer cylinder spring 44 and a concentric cylindrical support frame 45 secured to base 10a. A spacer is concentric with and disposed between inner cylinder 41 and outer cylinder 43. Spacer 46 is secured to the outer cylinder by diametrically opposed pins 47. Diametrically opposed elongated apertures 48 in inner cylinder 41 are provided for receiving the ends of diametrically opposed pins 47. The elongated portion of the apertures permits limited axial movement of the inner cylinder 41 along the axis of spin. For convenience of explanation, the inner cylinder 41, outer cylinder 43, spring 42, and spacer 46 will hereinafter be described as the sleeve assembly and be designated generally by the numeral 49.

Prior to filling the unit with fluid under pressure, the sleeve assembly 49 is manually positioned so that its surface engages inner gimbal 20 as shown at 50. A latch 51 is pivotally coupled to outer cylinder 43 through pivot pins 52 mounted on the support frame 45 (shown in FIG. 7). The latch is rotated so that it engages slot 53 in the sleeve assembly 49 thereby holding it in a fixed position. A spring, not shown, provides a force sufficient to retain latch 51 in slot 53. A second latch 54 is pivotally coupled to support frame 45 through pivot pin 52. This second latch is also coupled to the free end of a pressure responsive bellows 55. The pressure responsive bellows is mechanically grounded at its opposite end to base 10a. Bellows 55 actuates the second latch causing it to rotate in such a manner as to release the first latch 51 and couple the second latch 54 to the spacer 46 through apertures 56 and 57 in the support frame 45 and spacer 46 respectively. The operation of the caging mechanism will be described hereinafter.

Referring now to FIG. 4, there is shown a means for filling the housing 10. A charging valve 13 is mounted in base 10a to enable filling the assembled gyroscope with a fluid under pressure. In the preferred embodiment the valve is a "pneumatic check valve" such as the type used in inflating automobile tires.

In addition a release mechanism is mounted in the housing 10 for releasing the fluid under pressure to a low pressure area. The release means includes a substantially cylindrical plug 59 coupled to base 10a by a threaded cover plate 60. Plug 59 has diametrically opposed passages 61 communicating with its periphery and an internal cylindrical bore 62. In addition, plug 59 has a second cylindrical bore 63 therein for containing an explodable cartridge 64. Cartridge 64 is of cylindrical shape and has an indention 65 in one of its ends. The cartridge has an explosive substance therein which is ignitable by passing a current through leads 66. Explosion of the cartridge causes indention 65 to be turned inside out and push against surface 67 of plug 59 moving the cartridge out of the bore. A sleeve 68 is mounted concentrically with cartridge 64 substantially as shown. Movement of the sleeve 68 in response to the cartridge movement described above causes passages 61 to be exposed allowing flow of fluid therethrough. Apertures 69 in cover plate 60 permit flow to the atmosphere.

Other parts of the gyroscope, such as the pickoff means for each degree of freedom of movement are not shown. The presence of these parts in the drawing are not required for an understanding of the invention. In the preferred embodiment of the gyroscope two sets of pickoff elements are provided. One set indicates position of the inner gimbal 20 relative to the outer gimbal 17 and the other set indicates the position of outer gimbal 17 relative to the housing 10. Although the pickoff will be described hereinafter in terms of a potentiometer, other types of transducers could also be used. The resistance element of one of the potentiometers is preferably circular and mounted on the outer gimbal 17. The contact arm is mounted on the inner gimbal 20. Thus, relative movement of the inner gimbal to the outer gimbal will produce a voltage proportional to a fixed reference. The resistance element of the outer gimbal pickoff is mounted on the outer gimbal support 13 and the contact arm on the gimbal 17, producing a voltage proportional to the outer gimbal 17 relative to the housing 10. An electrical connection 70 is provided for picking off signals from the potentiometer sets and is affixed to the base 10a.

*Detailed Assembly*

For convenience, assembly of the gyroscope will be discussed in the preferred order of assembling the rotor assembly first. Referring now to FIG. 6, the two circular end plates 29 are assembled to the mass-member 28. Rotor support 35 is then inserted through apertures 31 in the end plates 29. In this position rotor bearings 32 are slipped over rotor support 35 to bearing surfaces thereon, and into apertures 31 in end plate 29. Lock nuts 38 are then threaded to the shaft and tightened to eliminate axial motion of the rotor. The purpose of adjusting the rotor bearings as described above is to eliminate any possible looseness in the bearings that would cause undesirable friction forces. The threaded end 36 of rotor support 35 is then inserted in the threaded aperture in the inner gimbal 20. A lock nut 37 is threaded to the rotor support 35 and retains the rotor support in a fixed position relative to inner gimbal 20. The lower half of inner gimbal 20 is then coupled to the top half 20a so that the cylindrical end portion 39 of rotor support 35 extends through cylindrical aperture 34 in the inner gimbal. Screws 23 are then inserted in the inner gimbal to clamp the halves together. Inner gimbal bearings 21 are then inserted in apertures provided for them in the inner gimbal 20.

Referring now to FIG. 4, outer gimbal shaft 18 is press fitted into diametrically opposed apertures in outer gimbal 17. With the outer gimbal shaft in place, the inner gimbal assembled as described above, is positioned for receiving inner gimbal bearings. With the inner gimbal in place, the outer gimbal bearings 19 with retainers 19a are slipped over the outer gimbal shafts 18. The entire gimbal and rotor assembly is then placed in the outer gimbal support ring 10c and clamped together by clamping blocks not shown.

After the gimbals are assembled as described above, the caging mechanism is then assembled. Inner cylinder 41, spring 42, outer cylinder 43, spacer 46 and pins 47 are preassembled as shown in FIG. 4 to form the sleeve assembly 49. The sleeve assembly 49 along with the outer cylinder spring 44 is then placed in the support frame 45. The support frame is then attached to base 10a by means of screws 71. Bellows 55 is then connected to the base 10 for example by a threaded end. The latches 51 and 54 are then attached to the pivot pin 52 in the frame pivotally coupling these members to support frame 45. In addition, the second latch 54 is attached to the free end of bellows 55.

After the various sub-assemblies have been completed as described above, the cylindrical spacer 10b is then placed on the base 10a. The entire rotor and support assembly is then placed on the cylindrical spacer and coupled thereto. The cover member 10d is then placed over the entire unit, and clamped in place by clamping ring 16. The caging mechanism sleeve assembly is moved along the spin axis until it engages inner gimbal 20. The latch 51 is spring loaded (not shown) and engages aperture 53 in the sleeve assembly and maintain the gimbals in a caged position.

Prior to inserting the release mechanism components a pressure sensitive tape is placed over the apertures 61 in the plug 58. The purpose of the pressure sensitive tape is to prevent leakage of the fluid under pressure to the atmosphere due to sliding fits between plug 59 and sleeve 68. The explodable cartridge 64 and sleeve 68 are then placed in the plug 59. The plug is inserted through an aperture provided for it in the base 10a and a cover plate 60 is threaded to the base holding the entire assembly in place. Suitable sealing means such as O-rings are provided to prevent fluid leakage from the housing through the threaded connections. A charging valve 13 is threaded and soldered to base 10 to complete the gyroscope.

*Detailed Operation*

For convenience of explanation, the detailed operation of the gyroscope will first be discussed without particular reference being made to the operation of the caging mechanism.

The gyroscope is filled with a fluid under pressure through the charging valve 58 (e.g. dry nitrogen at a pressure of approximately 1,000 p.s.i. at room temperature) and stored within the gyroscope. However, other compressible fluids may equally be suited.

It has been found desirable to mix helium with the compressible fluid. Presence of helium in the gyroscope permits mass spectrometer inspection during the storage period. It provides a relatively easy and inexpensive method of predicting the pressure of the fluid in the gyroscope for a desired storage period.

To operate the gyroscope the explodable cartridge 64 is ignited by passing a current (e.g. ¼ ampere) through the leads 66 to the explosive mixture in the cartridge. Ignition of the mixture causes an explosion inside the cartridge and forces the indentation 65 to be inverted. The cartridge contacts surface 67 in the plug forcing the cartridge to be moved axially downward from the position shown in FIG. 4. Downward movement of cartridge 64 causes sleeve 68 to move in the same direction and expose a portion of aperture 61. The fluid under pressure in aperture 61 punctures the pressure sensitive tape and causes piston 68 to move further rearward and completely expose the apertures. Fluid flowing through apertures 61 and 69 to the atmosphere causes a sudden pressure drop in the vicinity of the rotor. This pressure drop creates a differential pressure across orifices 26, and causes a fluid flow through the orifices to the impeller. The fluid flowing from the housing through the orifices strikes the impeller blades causing the rotor to rotate about the axis of spin. Fluid leaving the impeller flows through apertures provided in the inner gimbal 20 through the sleeve assembly 49 and through apertures 61 and 69 to the atmosphere. When all of the available energy is dissipated in accelerating the rotor (i.e. when the pressure in the housing is at a predetermined level) the pressure responsive caging mechanism is released thus uncaging the gimbals.

In this condition the gyroscope operates to furnish directional signals. The rotor continues to coast at sufficient speeds sufficiently high to provide valid directional signals for periods in excess of five minutes.

Figure 8:
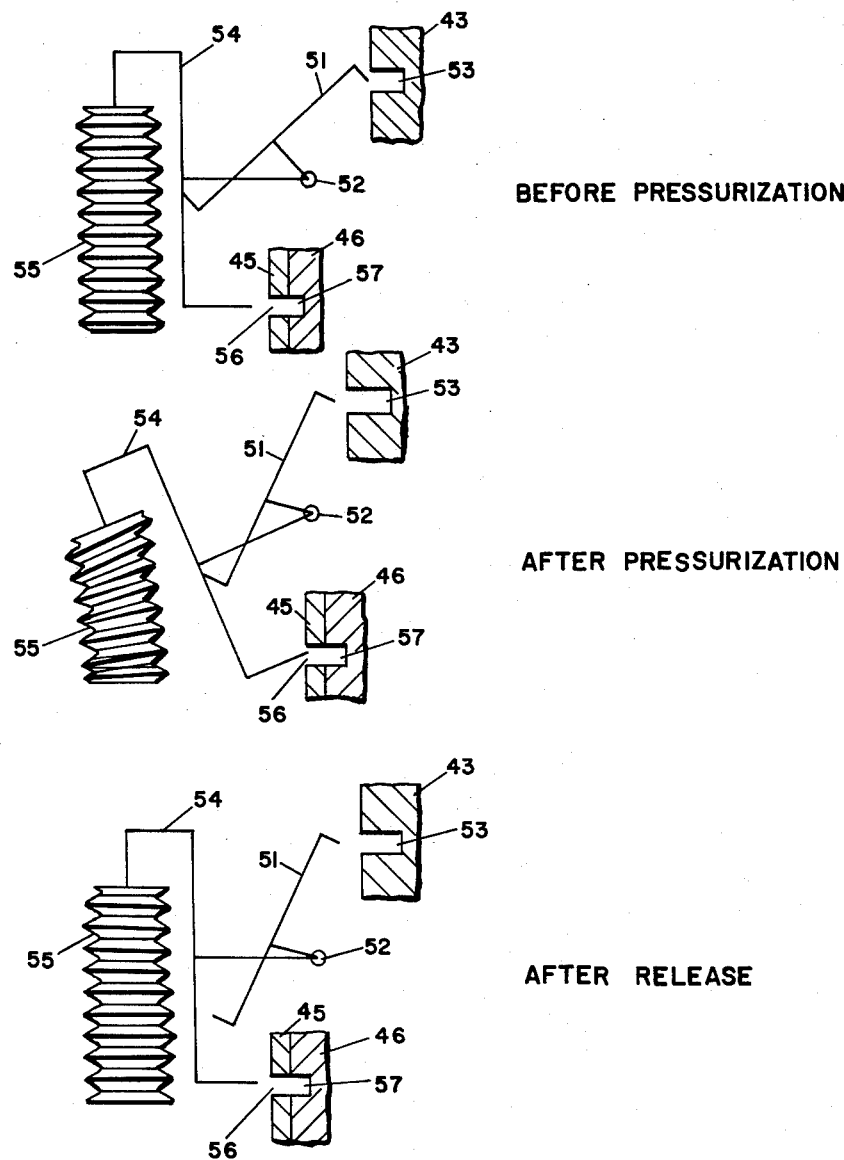
FIG. 8 is a schematic drawing illustrating the operation of the caging mechanism in FIG. 7.

The operation of the caging mechanism shown in FIGS. 4 and 7 is shown schematically in FIG. 8. For convenience of explanation, the components like numerals are used to designate identical parts in FIGS. 4, 7 and 8. In FIG. 8, the caging mechanism is first shown holding the gyroscope in a caged position before pressurization. As can be seen in FIG. 8, latch 51 has one of its ends in aperture 53 and the other of its ends touching the second latch 54. As the gyroscope is pressurized, the caging mechanism assumes the next position shown in FIG. 8. As can be seen in the schematic bellows 55 contracts as fluid pressure is applied. As the bellows contracts it causes locking member 54 to rotate counter-clockwise about the pivot 52. Counter-clockwise rotation of the second latch 54 forces latch 51 to be rotated in the same direction. When the unit is fully pressurized, latch 51 completely withdrawn from apertures 53 while latch 54 is in apertures 56 and 57. Once latch 51 is disengaged it is desirable to provide a positive method of preventing its reinsertion in aperture 53 during the uncaging process. Therefore, when latch 51 withdraws from aperture 53, outer cylinder 43 and spacer 46 moves axially downward to the position shown in FIG. 4. As can be seen in FIG. 4, aperture 53 is at a lower elevation than the locking portion of latch 51, thus making it impossible for the locking member to re-engage the aperture. When the pressure is released, the caging mechanism assumes the position finally shown in FIG. 8. As can be seen, release of the pressure causes bellows to expand and return to its original free length. Expansion of the bellows rotates latch 54 clockwise about pivot 52 causing it to withdraw from apertures 56 and 57. It should be noted that latch 51 remains in the same position it was after the unit was completely pressurized. Withdrawal of the second latch 54 from apertures 56 and 57 causes sleeve assembly 49 to move downward from the position shown in FIG. 4. The downward motion is provided by the spring force of outer cylinder spring 44 on spacer 46.

Thus, it can be seen in FIGS. 4, 7 and 8 that a pressure responsive means for actuating the caging mechanism is provided in the form of bellows 55. A first locking means in the form of latch 51 and aperture 53 is coupled to the gimbal 20 through the sleeve assembly 49 and maintains the gimbal in a caged position prior to filling the gyroscope with a fluid under pressure. In addition, a second locking means is provided in the form of the second latch 54 and apertures 56 and 57 in sleeve assembly 49. The second locking means is coupled to gimbal 20, the first locking means 51 and 53 and the pressure responsive means 55. Upon the introduction of a fluid under pressure to the gyroscope housing the second locking means operates simultaneously to disengage the first locking means and maintain gimbal 20 caged by engaging apertures 56 and 57. The second locking means is further operable to uncage gimbal 20 by withdrawing from apertures 56 upon the release of pressure from the gyroscope. As shown in FIGS. 4, 7 and 8, the second locking means moves in accordance with the motion of the pressure responsive means 55.

As can be seen from the above description and drawings, a gyroscope made in accordance with the present invention is an inexpensive self-contained fluid actuated unit. In addition, the gyroscope is a reliable unit in that it can be tested and retested prior to its use. In use the only part of the unit that is destroyed, is the explodable cartridge and pressure sensitive tape in the releasing mechanism. In addition, the gyroscope has a unique caging mechanism which does not require any external source of power for energization. Furthermore, the gyroscope as a self-contained unit is capable of relatively long storage periods and can be made operable in a relatively short period of time.

While applicant does not intend to be limited to any particular shapes or sizes of parts in the gyroscope described with reference to FIGS. 1 through 8, inclusive, there follow sizes, shapes or dimensions for the more important parts which have been found to be particularly suitable for a gyroscope of the type represented by FIGS. 1 through 8:

| | |
|---|---|
| Over-all size of gyroscope | 3.25" in diameter by 4.5" in length. |
| Rotor inertia | 850 gm.-cm.² |
| Initial pressure | 1,000 p.s.i.g. @ 20° C. |
| Diameter of orifice 26 | 1/16". |
| Number of orifice 26 | 10. |
| Diameter of opening 20c | 7/32". |
| Number of openings 20c | 4. |
| Rotor diameter (approx.) | 1⅝". |
| Number of rotor blades 27 | 24. |
| Maximum rotor speed | 8,000 r.p.m. (average) |
| Activation time | 100 milliseconds (uncaged). |
| Rotor coasting characteristic | 8,000 r.p.m. to 1,800 r.p.m. in a minimum of 6 minutes. |

While there have been described what are at present considered to be the preferred embodiments of this invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:
1. A gyroscope comprising:
   (a) a sealed first housing,
   (b) a second housing disposed within said first housing,
   (c) a rotor disposed within said second housing,
   (d) means supporting said rotor for rotation about a first axis,
   (e) passage means communicating between the interior of said second housing and the exterior thereof within said first housing,
   (f) spin release means venting the interior of said second housing to a region in the exterior of said first housing,
   (g) impellor means on said rotor for imparting rotary motion thereto in response to the passage of fluid thereover,
   (h) a fluid pervading the interior of said first housing and having a pressure substantially greater than the pressure in said region,
   (i) whereby actuation of said spin release means provides flow of fluid from the interior of said second housing to said region and from the exterior of said second housing to the interior thereof, whereby said fluid engages said impellor means to rotate said rotor.
2. The combination defined in claim 1 in which said second housing is a gimbal and including means supporting said second housing for rotation about an axis perpendicular to said first axis.
3. The combination defined in claim 2 including caging means responsive to the difference in pressure between the exterior of said first housing and the region between said first and second housings, said caging means inhibiting rotation of said second housing only when said pressure differential is above a predetermined level.
4. The combination defined in claim 1 in which said passage means is oriented to direct said fluid against said impellor means to provide a component of force tangential to said rotor.
5. The combination defined in claim 1 in which said passage means provides a more constricted path for the flow of said fluid than said spin release means, thereby to provide a relatively fast drop in pressure within said first housing and a relatively slow drop in pressure in the region between the first and second housings upon the actuation of said spin release means.

6. A gyroscope comprising:
 (a) a sealed first housing,
 (b) a second housing disposed within said first housing,
 (c) a rotor disposed within said first housing,
 (d) means supporting said rotor for rotation about a first axis,
 (e) said housings defining a first chamber at least a part of which is between said second housing and said rotor, and a second chamber between said second housing and said first housing,
 (f) a spin release valve venting said first chamber to the exterior of said first housing,
 (g) impellor means on the surface of said rotor for imparting rotary motion thereto in response to the passage of fluid thereover,
 (h) means forming an orifice communicating between said first and second chambers and oriented to direct fluid passing therethrough against said impellor means,
 (i) a fluid pervading the interior of said first housing and having a pressure substantially greater than the pressure in that portion of the exterior of said first housing to which said spin release valve communicates.

7. A gyroscope comprising:
 (a) a sealed first housing,
 (b) a second housing disposed within said first housing,
 (c) a rotor disposed within said second housing,
 (d) means supporting said rotor for rotation with respect to said second housing about a first axis,
 (e) means supporting said second housing for rotation with respect to said first housing about a second axis substantially perpendicular to said first axis,
 (f) a circumferentially extending series of impellor blades on the exterior of said rotor for imparting rotary motion to said rotor about said first axis in response to the passage of fluid thereover,
 (g) means forming a plurality of passages communicating between the interior of said second housing and the exterior thereof within said first housing,
 (h) said passages being oriented to direct fluid passing therethrough against said impellor blades,
 (i) a spin release valve for venting the interior of said second housing to a region in the exterior of said first housing, and
 (j) a gaseous fluid pervading the interior of said first housing and having a pressure substantially greater than the pressure in said region.

8. In a fluid actuated gyroscope, having a housing, gimbal means pivotally supported in said housing, rotor means pivotally supported in said gimbal means for rotation about an axis, said housing means comprising a fluid storage means for storing a fluid under pressure, a caging mechanism comprising: pressure responsive means for actuating said caging mechanism; first locking means coupled to said gimbal means and said pressure responsive means for maintaining said gimbal means in a caged position prior to filling said fluid storage means with a fluid under pressure; second locking means coupled to said gimbal means, said pressure responsive means and said first locking means for simultaneously releasing said first locking means and locking said gimbal means in a caged position upon the introduction of a fluid under pressure to said storage means and uncaging said gimbal means upon the release of a fluid under pressure from said storage means in accordance with the movement of said pressure responsive means thus providing said caging mechanism.

References Cited in the file of this patent
UNITED STATES PATENTS

| | | |
|---|---|---|
| 741,683 | Leavitt | Oct. 20, 1903 |
| 1,077,344 | Hennig | Nov. 4, 1913 |
| 2,175,143 | Cornelius | Oct. 3, 1939 |
| 2,200,976 | Bates | May 14, 1940 |
| 2,415,899 | Meyer et al. | Feb. 18, 1947 |